Patented Mar. 30, 1926.

1,578,520

UNITED STATES PATENT OFFICE.

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO.

INSECTICIDE-FUNGICIDE AND PROCESS FOR MAKING THE SAME.

No Drawing. Application filed March 8, 1924, Serial No. 697,712. Renewed February 5, 1926.

*To all whom it may concern:*

Be it known that I, EDWARD C. HOLTON, a citizen of the United States, and a resident of Olmsted Falls, county of Cuyahoga, State of Ohio, have invented certain new and useful Improvements in Insecticide-Fungicide and Processes for Making the Same, of which the following is a specification.

This invention relates to an improved form of insecticide and fungicide and process for making same.

The consumption of insecticides today is vastly greater than it was a few years ago, yet it hardly keeps pace with the increase in insect infestation. Heretofore arsenic has been one of the principal substances used as an insecticide and the demand for this material has become so great that there is a possibility that the world's supply will become inadequate to cope with the situation.

Comparable to the losses caused by insects are those caused by fungi and it has become quite general practice to mix various insecticides and fungicides in an attempt to check both of these evils in one application. Sometimes the mixtures which have been heretofore used have given good results and at other times undesirable reactions have taken place which cause burning of the foliage and fruit, and even the loss of the insecticide before it has accomplished its mission. It is an object of this invention to produce a combined insecticide-fungicide which not only possesses great efficiency in itself, but may be mixed in any desired proportions, with the arsenical insecticides without any disastrous results. It is also an object of the invention to provide an effective substitute for arsenic, for these purposes, that will relieve the strain on that most useful commodity.

It has long been known that the salts of barium possesses a considerable degree of toxicity, and barium carbonate and barium chloride, have been used to a considerable extent for poisoning insects and vermin. Owing to the extreme solubility of barium chloride it is unsatisfactory for general use as an insecticide, because it is usually injurious to the vegetation to which it is applied, and it is also easily washed off by rains.

The fluorides of the different elements, generally, are toxic but the fluorides of the alkalies, on account of their ready solubility in water, have not been heretofore used as insecticides and fungicides, although they are largely used as antiseptics. The fluorides of the elements of the alkaline earths group are insoluble or but slightly soluble, in water and I have found that they are well adapted for use as insecticides and fungicides, and of these the barium compound is generally to be preferred, for in this salt the toxicity is developed to the highest degree, probably due to the fact that both of its components are strongly toxic. While barium fluoride, as ordinarily prepared, is crystalline, it is an object of this invention to produce a crypto-crystalline or amorphous barium fluoride coprecipitated with sulfur according to the general method described in my patent application, Serial No. 697,713.

Barium fluoride appears to possess the proper degree of solubility to be toxic to the fungoid forms of vegetation and, at the same time, it is not sufficiently soluble to injure the foliage of the more advanced forms of vegetation, such as that of the apple, peach, pear, beans, cotton, etc. Barium fluoride is also a stomach poison, though generally to a lesser degree than arsenic.

Sulfur has long been used as a fungicide, and experience has shown that the best results are attained by the use of sulfur in a state of extreme division. Sulfur may be brought into this state by mechanical means or by chemical processes or by a combination of the two. Heretofore it has been customary to prepare a finely divided, chemically precipitated sulfur by the reaction of hydrochloric or sulfuric acids on alkaline polysulfids. As typical of this the following reactions may be cited:

$$Na_2S_x + 2HCl = 2NaCl + H_2S + (x-1)S$$
$$Na_2S_x + H_2SO_4 = Na_2SO_4 + H_2S + (x-1)S$$

Also solutions of hydrogen sulfid and sulfur dioxide may be caused to react or a reaction may take place in the gaseous phase. This reaction may be expressed thus:

$$2H_2S + SO_2 = 2H_2O + 3S$$

The above reactions have been well known and utilized in various industries for many years. Sulfur prepared by such methods is rather expensive for the reason that the salts, such as sodium chloride or sodium sulfate, simultaneously formed, are so diluted that they are worthless and must be removed by extensive washing which is rather costly.

If sulfur, which has been prepared in the manner described, is to be used as a fungicide, it is best preserved in a wet state, for after it has once been dried it is a difficult and expensive matter to convert it into a dry powder form which will possess the property of being readily wettable with water.

It has long been known that by heating together barytes and coal, in suitable furnaces, there will be formed a product technically known as "black ash". When this "black ash" is lixiviated with water, the major part of the barium passes into solution as a "barium liquor", which is usually considered a mixture of barium sulfid, sulfhydrate and hydroxide, but for simplicity's sake may be represented as barium monosulfid or BaS. This solution of barium sulfid is capable of absorbing more sulfur, when boiled therewith, thus forming a solution of barium polysulfid which may be represented as $BaS_x$. In a general way the reactions which take place may be represented as follows:

$$BaSO_4 + 4C = BaS + 4CO$$
$$BaSO_4 + 2C = BaS + 2CO_2$$
$$2BaS + 2H_2O = BaS_2H_2 + BaO_2H_2$$
$$BaS + (x-1) = BAS_x$$

My preferred method of practising my invention is to first prepare a "black ash", such as is used in the lithopone industry, and then lixiviate this with water in the usual manner to produce what is commercially known as "barium liquor". This is then heated with sulfur in quantity sufficient to form a polysulfid of the composition represented by the symbol $BaS_x$ in which x is greater than one and may vary from one to five. This reaction may be expressed thus:

$$BaS + (x-1)S = BaS_x$$

The solution of polysulfid, thus produced, is filtered and conveyed to a suitable reaction tower or vessel and fluorhydric acid, either in the gaseous state or in aqueous solution, is gradually added thereto with proper agitation.

The reaction which takes place may be represented thus:

$$BaS_x + 2HF = BaF_2 + H_2S + (x-1)S$$

Since barium fluoride is soluble in cool water to an extent of less than one quarter of one percent, there is only a very slight loss of either barium or fluorine and there is a precipitation of the greater part of the sulfur. A portion of the sulfur, which is twenty-five percent of the total sulfur when x equals 4, passes away as hydrogen sulfid. By agitating this gas with a further solution of $BaS_x$ and gaseous sulfur dioxide, or an aqueous solution of sulfur dioxide, in a closed apparatus provided with an agitator, or by allowing them to flow together or in counter currents in a reaction tower, or by any of the usual methods for effecting such reactions, the total sulfur in the compounds used may be obtained in a form suitable for use as a fungicide in combination with insecticidal and fungicidal barium fluoride.

The sulfur dioxide used to recover the sulfur in the hydrogen sulfide may be prepared directly from burning sulfur, or may be drawn from cylinders of the commercial liquid sulfur dioxide. Some of the reactions taking place may be represented thus:

$$BaS_x + 2SO_2 + H_2S = BaS_2O_3 + H_2O + (x+1)S$$
$$BaS_2O_3 + 2HF = BaF_2 + SO_2 + H_2O + S$$

Other intermediate reactions may, and undoubtedly do take place, but by maintaining the proper proportions, practically all of the barium in the barium polysulfid solution used, and practically all of the fluorine in the hydrofluoric acid used, are recovered as barium fluoride; and practically all of the sulfur from the barium polysulfid, together with all of the sulfur in the sulfur dioxide, is recovered as fungicidal sulfur in intimate mixture with the barium fluoride.

When barium fluoride is coprecipitated with sulfur in the manner described, there is a tendency for the barium fluoride to assume a crypto-crystalline or amorphous form, rather than the definite crystalline form usually assumed when coming out of solution in water. This tendency may be still further augmented by adding to the liquors, before precipitation, a very small quantity of some substance such as glue or casein, or gum acacia, or sulfonated castor oil or some other substance, such as is ordinarily used as a protective to prevent crystallization. Care must be exercised, however, to use the minimum quantity required, to produce the desired effect, since anything more than this tends to make the subsequent filtration extremely difficult. It is not possible to state in advance the exact amount of the protective substance to be used, since this varies somewhat with the nature of the substance and the composition and concentration of the solution under treatment. However, anyone practicing this invention readily learns under what conditions and to what extent the protective substances should be used to give a precipitate approximately amorphous, and yet readily filterable.

In practicing this invention, if it should be found that the filtration is rendered too slow or too difficult the use of the protective substance, before filtration, may be dispensed with and some of the beneficial results sought, may be obtained by dusting the protective, in a dry powder form, over the wet filter cake, or a solution or suspension of the protective substance may be sprinkled over the wet filter cake.

The coprecipitate of barium fluoride and sulfur produced in accordance with my invention is a highly useful material for use as an insecticide and fungicide and the sulfur in the mixture is maintained in its most active condition and is at all times readily wettable with water so that the material may be used in a wet spray or in dry form for dusting purposes. The barium fluoride, being in a substantially amorphous condition, as above described, is also in its most active form for the purposes referred to and constitutes the major portion of the mixture, the minor part of which is sulfur, with a small percentage, usually less than two percent, of the protective substance. There will also be traces of other compounds of the elements of the alkaline earths group but these do not affect the efficiency of the mixture.

Having thus described my invention, what I claim is:

1. In methods for the production of a product for the purposes specified, the step which consists in reacting upon a polysulfid of barium with fluorhydric acid for producing a coprecipitate of finely divided sulfur and barium fluoride.

2. In methods for the production of a product for the purposes specified, the step which consists in reacting upon an aqueous solution of a polysulfid of barium with fluorhydric acid, using a protective substance to prevent crystallization, and thereby producing a coprecipitate of finely divided sulfur and substantially amorphous barium fluoride.

3. In methods for the production of a product for the purposes specified, the steps which consist in boiling a barium sulfid liquor with sulfur to form a barium polysulfid liquor, and then reacting upon the polysulfid with fluorhydric acid for producing a coprecipitate of finely divided sulfur and barium fluoride.

4. In methods for the production of a product for the purposes specified, the steps which consist in boiling a barium sulfid liquor with sulfur to form a barium polysulfid liquor, clarifying the polysulfid liquor, and reacting upon the clarified liquor with fluorhydric acid and sulfur dioxide for producing a coprecipitate of finely divided sulfur and barium fluoride.

5. In methods for the production of a product for the purposes specified, the steps which consist in boiling a barium sulfid liquor with sulfur to form a barium polysulfid liquor, then reacting upon the polysulfid liquor with fluorhydric acid, and then mingling the gases evolved in said reaction with sulfur dioxide and more of the polysulfid liquor and thereby producing a coprecipitate of finely divided sulfur and barium fluoride.

6. In methods for the production of a product for the purposes specified, the steps which consist in combining an aqueous solution of a polysulfid of an element of the alkaline earths group with fluorhydric acid and sulfur dioxide and a colloid to form a coprecipitate of a substantially amorphous fluoride of said element and finely divided sulfur.

7. In methods for the production of a product for the purposes specified, the steps which consist in combining an aqueous solution of a polysulfid of an element of the alkaline earths group with fluorhydric acid and sulfur dioxide and a colloid to form a coprecipitate of a substantially amorphous fluoride of said element and finely divided sulfur, and drying said coprecipitate in a temperature below the melting point of sulfur.

8. As a new product or article of manufacture, a mixture of finely divided sulfur and a substantially amorphous fluoride of an element of the alkaline earths group.

9. As a new product or article of manufacture, a mixture of finely divided sulfur and barium fluoride in substantially amorphous form.

10. As a new product or article of manufacture, a dry powder consisting of a mixture of chemically precipitated sulfur and a chemically precipitated fluoride of an element of the alkaline earths group in substantially amorphous form.

11. As a new product or article of manufacture for insecticidal and fungicidal purposes, a dry powdered mixture of which the major portion is a fluoride of an element of the alkaline earths group and the minor portion is finely divided sulfur.

12. As a new product or article of manufacture for insecticidal and fungicidal purposes, a dry powdered mixture of which the major portion is barium fluoride in substantially amorphous form and the minor portion is finely divided sulfur.

In testimony whereof I affix my signature.

EDWARD C. HOLTON.